United States Patent
Suzuki et al.

(10) Patent No.: US 8,730,000 B2
(45) Date of Patent: May 20, 2014

(54) REACTOR AND MANUFATURING METHOD THEREOF

(71) Applicant: Tamura Corporation, Tokyo (JP)

(72) Inventors: Kotaro Suzuki, Saitama (JP); Kensuke Maeno, Saitama (JP); Ryo Nakatsu, Saitama (JP)

(73) Assignee: Tamura Corporation, Tokyo (JP)

( * ) Notice: Subject to any disclaimer, the term of this patent is extended or adjusted under 35 U.S.C. 154(b) by 0 days.

(21) Appl. No.: 13/660,897

(22) Filed: Oct. 25, 2012

(65) Prior Publication Data
US 2013/0106556 A1    May 2, 2013

(30) Foreign Application Priority Data
Oct. 31, 2011  (JP) .................. 2011-239807

(51) Int. Cl.
*H01F 27/24* (2006.01)
*H01F 27/28* (2006.01)
*H01F 17/04* (2006.01)

(52) U.S. Cl.
USPC ........... 336/212; 336/182; 336/184; 336/233; 336/221

(58) Field of Classification Search
USPC .......... 336/212, 184, 182, 199, 219, 222, 233
See application file for complete search history.

(56) References Cited

U.S. PATENT DOCUMENTS

| | | | |
|---|---|---|---|
| 2002/0014941 A1* | 2/2002 | Yoshioka et al. | 336/184 |
| 2002/0075116 A1* | 6/2002 | Peels et al. | 336/200 |
| 2002/0162687 A1* | 11/2002 | Akihiko | 174/262 |
| 2009/0108971 A1* | 4/2009 | Okamoto | 336/65 |
| 2009/0315663 A1* | 12/2009 | Kiyono et al. | 336/219 |
| 2010/0171580 A1* | 7/2010 | Abe et al. | 336/178 |
| 2011/0156853 A1* | 6/2011 | Kato et al. | 336/192 |
| 2012/0119866 A1* | 5/2012 | Kim et al. | 336/200 |
| 2013/0038415 A1* | 2/2013 | Ooishi et al. | 336/61 |

FOREIGN PATENT DOCUMENTS

| | | |
|---|---|---|
| JP | 2008-78219 | 4/2008 |
| JP | 2010-238798 | 10/2010 |
| JP | 2010-267932 | 11/2010 |
| WO | WO 2011/132361 | * 10/2011 |

* cited by examiner

*Primary Examiner* — Alexander Talpalatski
*Assistant Examiner* — Kazi Hossain

(57) ABSTRACT

Divided cores 11, 12 includes left and right leg portions and a yoke portion and formed by molding a yoke portion side core material within resin. The leg portions of the divided core are formed by tubular core mounting portions 41, 42. I-shaped leg portion side core materials 51-53 and spacers 6 are mounted in the tubular core mounting portions. A ring-shaped molded core 1 is formed by abutting and integrating the respective leg portions of two divided cores, and a coil 100 is wound around the molded core.

10 Claims, 9 Drawing Sheets

REACTOR AND MANUFATURING METHOD THEREOF

RELATED APPLICATIONS

The present application claims priority from the Japanese Application 2011-239807 filed on Oct. 31, 2011.

FIELD OF THE INVENTION

The present invention relates to a reactor used for example in a vehicle such as an electric automobile or a hybrid vehicle, and a manufacturing method thereof.

DESCRIPTION OF THE RELATED ART

In a known conventional reactor installed in a vehicle, a magnetic gap having a predetermined width is provided between a plurality of core materials with the aim of preventing a reduction in inductance. In this type of reactor, an integrated core formed by sandwiching a spacer made of a ceramic or the like in the gap part between the core materials and adhering the spacer to the adjacent core materials using an adhesive is employed.

The reactor is constructed by winding a coil around the core thus formed. In this case, insulation is provided between the core and the coil using a resin bobbin or a molded core in which the entire core is molded from resin. In consideration of earthquake resistance and climate resistance, a molded core is used particularly often as a reactor installed in a vehicle, as indicated by Japanese Patent Application Publication No. 2008-78219, Japanese Patent Application Publication No. 2010-267932, and Japanese Patent Application Publication No. 2010-238798.

A gapped core is constituted by a plurality of core materials and a spacer, and therefore, to manufacture this type of molded core, the plurality of core materials and the spacer are set in a resin molding die, whereupon the die is filled with resin. However, it is difficult to position the plurality of core materials and the spacer in the die accurately, and therefore positional deviation may occur between the core materials. To prevent this, the shape of the die must be made more complicated.

To prevent positional deviation between the core materials, the core materials and the spacer may be set in the die after being fixed to each other in advance using an adhesive, whereupon the die is filled with the resin. With this method, however, a process for adhering the core materials to the spacer must be performed, leading to an increase in the complexity of a manufacturing process.

Hence, with the prior art, it is difficult to position the core materials and the spacer accurately in the molded core, and as a result, problems occur in that the molded core cannot be manufactured easily and the manufactured molded core is not able to exhibit an intended performance.

SUMMARY OF THE INVENTION

The present invention has been designed to solve the problems in the prior art described above, and an object thereof is to provide a reactor and a manufacturing method thereof with which a core material can be positioned in a die easily such that a plurality of core materials and a spacer can be disposed accurately within molded resin.

A reactor according to the present invention includes following features.

(1) A U-shaped or J-shaped divided core including left and right leg portions and a yoke portion connecting the leg portions is formed by molding a yoke portion side core material within a resin.

(2) Left and right end surfaces of the yoke portion side core material molded within the resin are respectively exposed to the left and right leg portions of the divided core.

(3) The left and right leg portions of the divided core are formed integrally from a resin molded to an outer periphery of the yoke portion side core material, and respectively include tubular core mounting portions extending from respective outer peripheries of the end surfaces of the yoke portion side core material.

(4) An I-shaped leg portion side core material and a spacer are mounted in the tubular core mounting portions formed in the left and right leg portions such that the spacer is sandwiched between the end surface of the yoke portion side core material molded within the resin and an end surface of the leg portion side core material.

(5) Two of the divided cores configured as described above are prepared, the two divided cores are formed into a ring-shaped core by abutting and integrating respective end portions of the core mounting portions thereof, and a coil is wound around the ring-shaped core.

A method of manufacturing a reactor having a configuration such as that described above using processes such as those described above also serves as an aspect of the present invention.

According to the present invention, following effects are obtained.

(1) There is no need to adhere a plurality of core materials to each other before setting the core materials in the die, and the number of core materials set in the die is small. Therefore, the core materials can be positioned in the die easily and accurately.

(2) The positions of the core materials subsequently mounted in the divided core are restricted by the resin mounting portions formed integrally with the pre-molded core material, and therefore the positional deviation between the core materials does not occur. As a result, a molded core constituted by a plurality of core materials and spacers can be manufactured easily.

(3) The relative positions of the core materials, and the positions of the core materials and the spacers can be secured with a high degree of precision, and therefore a reactor performance can be exhibited as intended.

DESCRIPTION OF THE EMBODIMENTS

1. First Embodiment

Configuration

Figure 1:
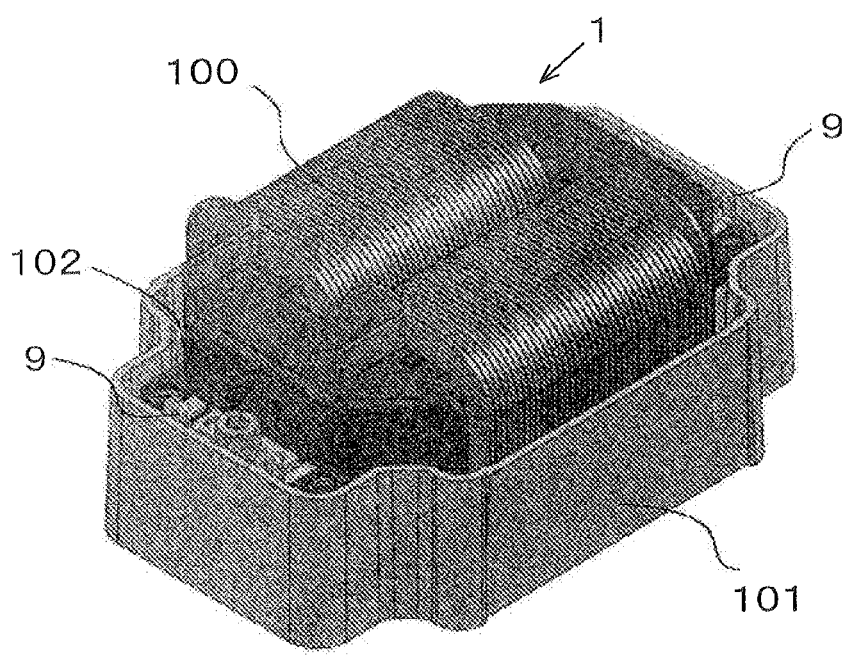
FIG. 1 is a perspective view showing an assembled condition according to a first embodiment.
Figure 2:
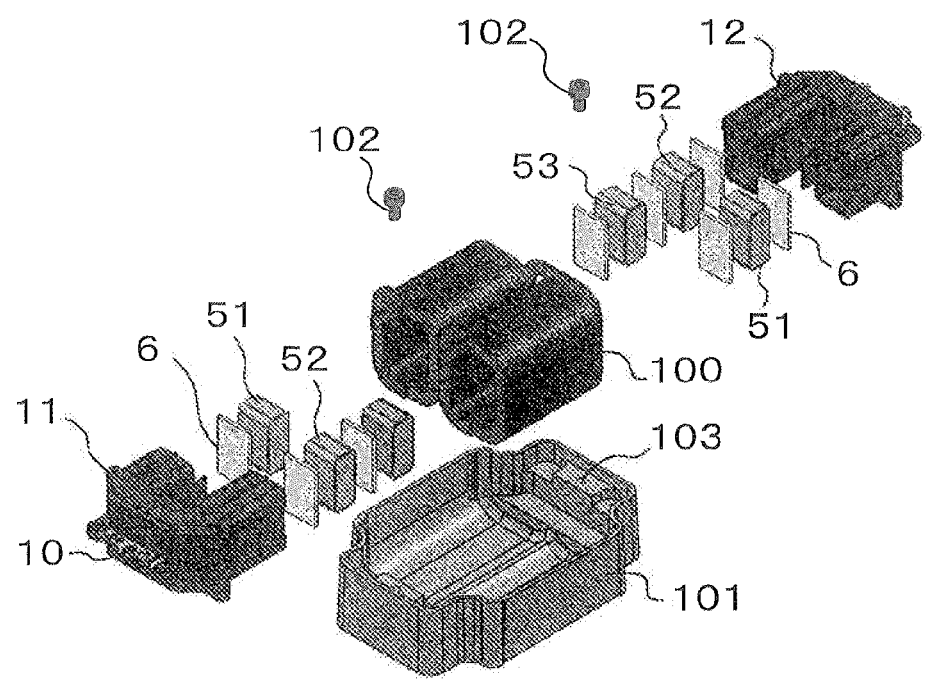
FIG. 2 is an exploded perspective view of the first embodiment.
Figure 3:
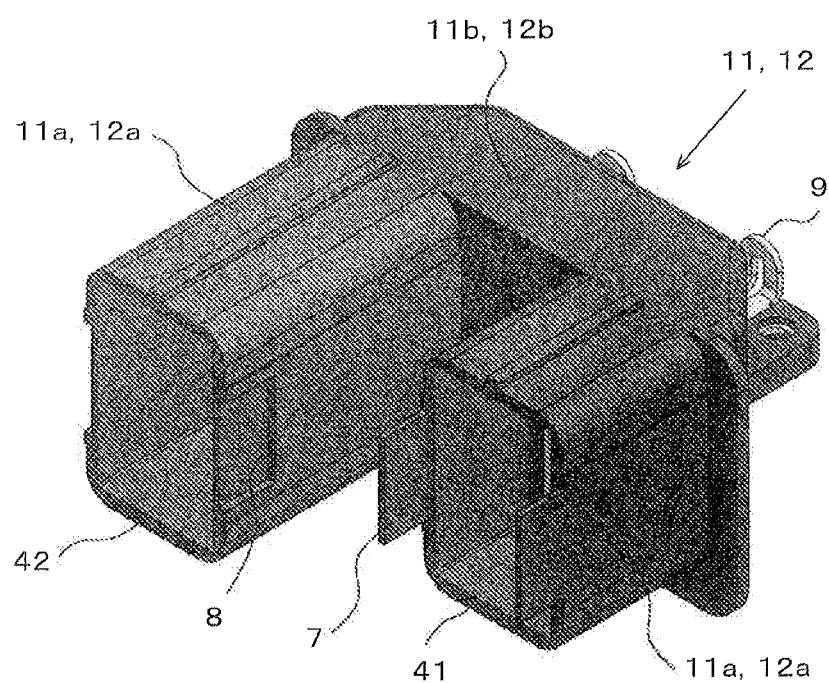
FIG. 3 is a perspective view of a divided core according to the first embodiment.
Figure 4:
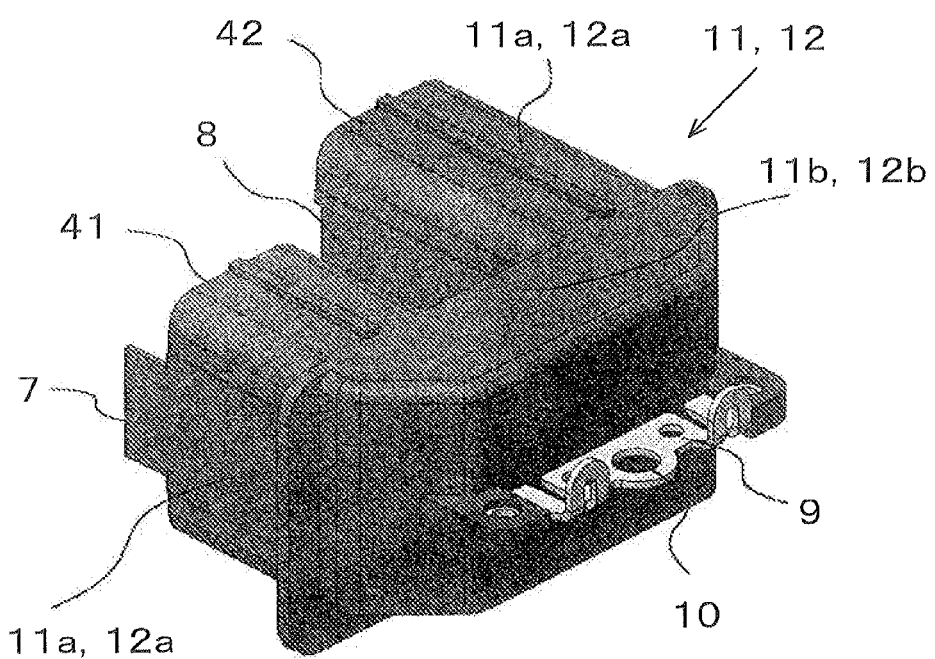
FIG. 4 is a perspective view showing the divided core of FIG. 3 from another direction.

As shown in FIGS. 1 and 2, a reactor according to this embodiment is constituted by a molded core 1, a coil 100 wound around the molded core 1, and a case 101 housing the molded core 1 and the coil 100. The molded core 1 is formed in a ring shape by abutting and integrating two J-shaped divided cores 11, 12. More specifically, the divided cores 11, 12 are vertically symmetrical members, and the ring-shaped molded core 1 can be manufactured by inverting one divided core 12 upside-down and then combining the inverted divided core 12 with the other, non-inverted divided core 11.

Figure 5:
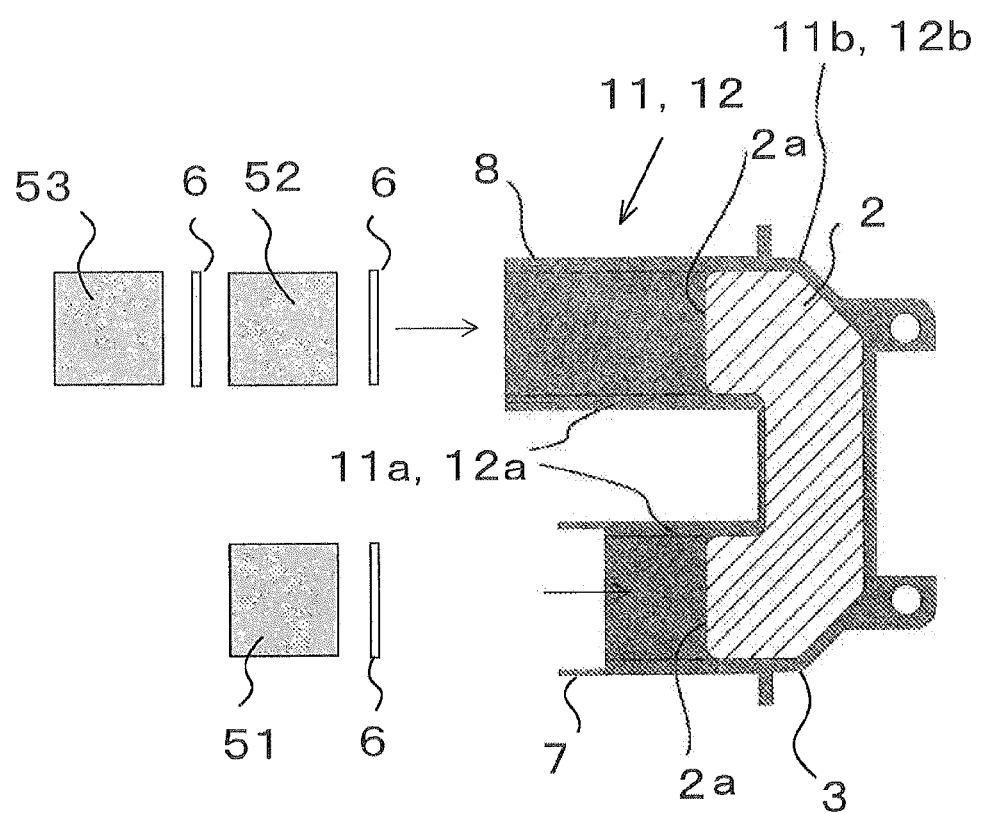
FIG. 5 is a sectional view showing a method of manufacturing a molded core according to the first embodiment.
Figure 6:
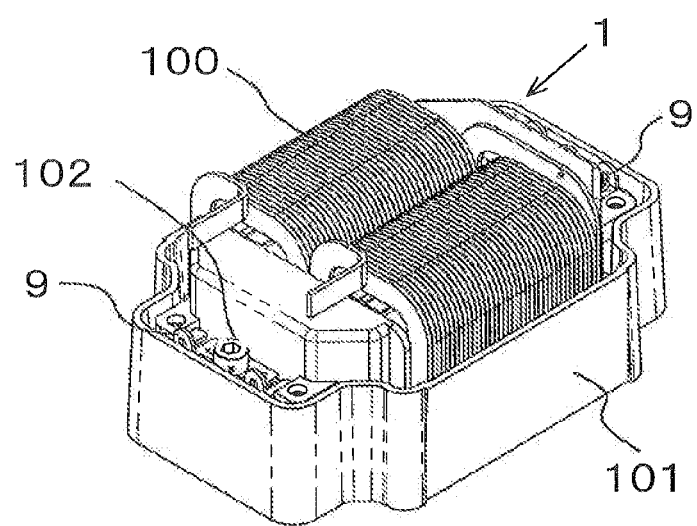
FIG. 6 is a perspective view showing an assembled condition according to a second embodiment.
Figure 7:
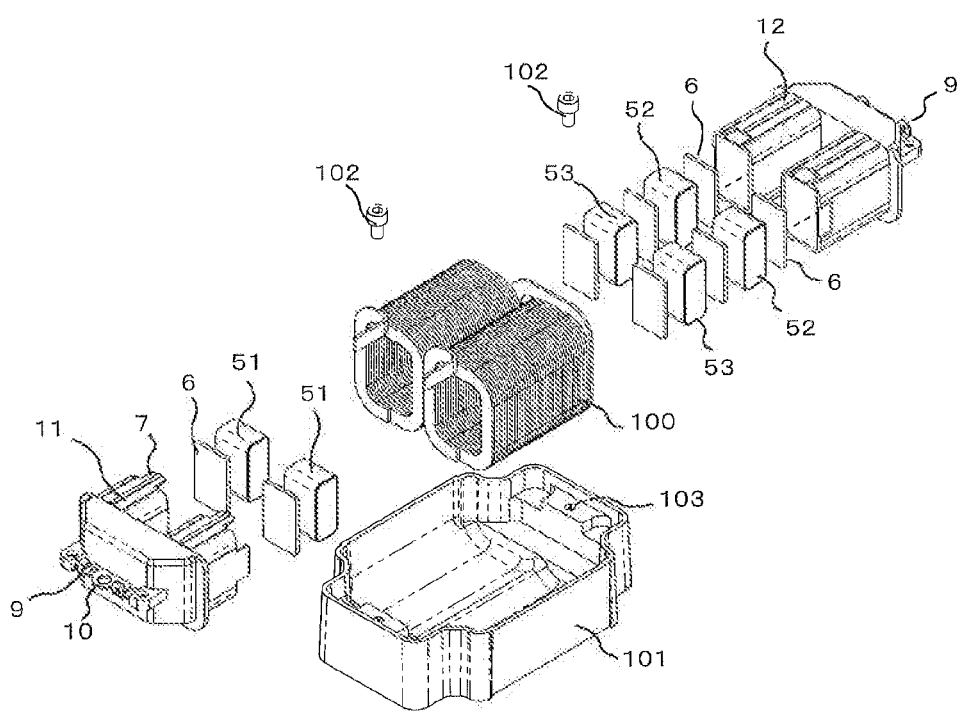
FIG. 7 is an exploded perspective view of the second embodiment.
Figure 8:
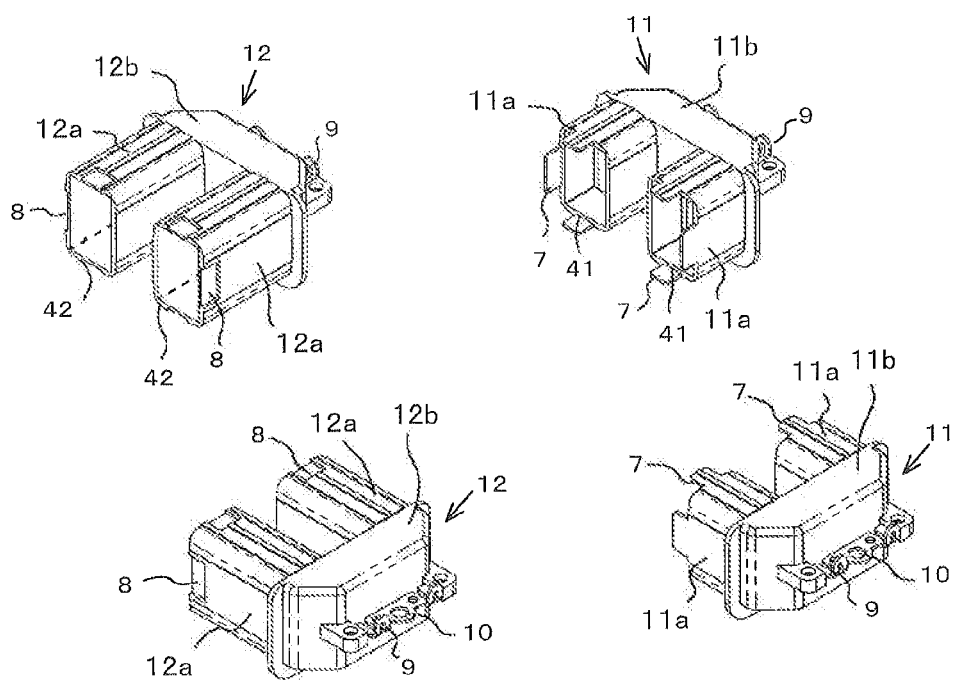
FIG. 8 is a perspective view showing respective divided cores according to the second embodiment seen from different direction.
Figure 9:
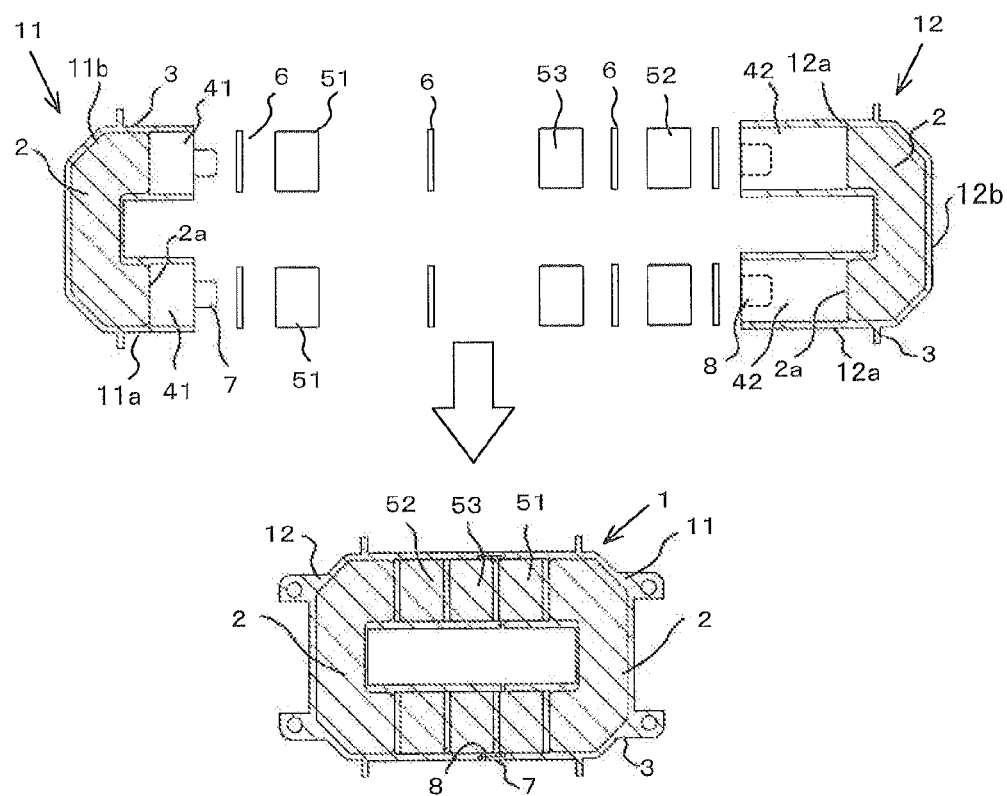
FIG. 9 is a sectional view showing a method of manufacturing a molded core according to the second embodiment.

The respective divided cores 11, 12 are constituted by left and right leg portions 11a, 12a and yoke portions 11b, 12b connecting the leg portions 11a, 12a, and are formed by molding a U-shaped yoke portion side core material 2 within resin 3, as shown in FIG. 5. Left and right end surfaces 2a of the yoke portion side core material 2 molded within the resin 3 are exposed respectively to the left and right leg portions 11a, 12a of the divided cores 11, 12.

Tubular core mounting portions 41, 42 extending from respective outer peripheries of the end surfaces of the yoke portion side core material 2 are formed integrally with the left and right leg portions 11a, 12a of the divided cores 11, 12 by the resin 3 molded to an outer periphery of the yoke portion side core material 2. I-shaped leg portion side core materials 51, 52, 53 and spacers 6 are mounted in the tubular core mounting portions 41, 42 such that the spacers 6 are sandwiched between the end surfaces 2a of the yoke portion side core material 2 molded within the resin and end surfaces of the leg portion side core materials 51, 52.

In this embodiment, the respective divided cores 11, 12 are formed in a J shape, and therefore the tubular core mounting portions 41, 42 have different lengths. More specifically, one leg portion side core material 51 is mounted in the short core mounting portion 41, while two leg portion side core materials 52, 53 are mounted in the long core mounting portion 42.

Engagement members are provided on respective tip ends of the core attachment portions 41, 42 to position the two divided cores 11, 12 when abutting the divided cores 11, 12. More specifically, tongue pieces 7 that project to the side of the other divided core are provided on inside and outside edges of the short core mounting portion 41, and recessed portions 8 into which the tongue pieces 7 provided on the other divided core fit are provided in the short core mounting portion 42.

Fasteners 9 are provided integrally in yoke portion side parts of the respective divided cores 11, 12 for fixing the molded core 1, around which the coil 100 is wound, to the case 101. A base portion of each fastener 9 is molded together with the yoke portion side core material 2 within the resin 3 forming the divided cores 11, 12. A bolt hole 10 is opened in the fastener 9, and a bolt 102 prepared separately is inserted into the bolt hole 10. The molded core 1 is fixed to the case 101 by screwing a tip end of the bolt 102 into a screw hole 103 provided in the case 101.

Operations

A method of manufacturing the reactor according to this embodiment, configured as described above, is as follows.

(1) The divided cores 11, 12 are manufactured by setting the U-shaped yoke portion side core material 2 and the fastener 9 in a die, filling the die with the resin 3, and hardening the resin 3.

(2) The manufactured divided cores 11, 12 are removed from the die, whereupon the spacers 6 and the I-shaped leg portion side core materials 51 to 53 are inserted into the core mounting portions 41, 42 of the respective divided cores 11, 12. In this case, the respective core materials and the spacers may be joined using an adhesive, or the spacers 6 and the leg portion side core materials 51 to 53 may simply be fitted into the core mounting portions 41, 42.

(3) The ring-shaped molded core 1 is formed by inserting the two leg portions 11a, 12a of the divided cores 11, 12 in which the core materials and the spacers are mounted into the coil 100 until end portions of the leg portions 11a, 12a abut each other. In this case, the two divided cores 11, 12 are positioned by fitting together the tongue pieces 7 and the recessed portions 8 formed on the end portions of the respective leg portions 11a, 12a.

(4) The ring-shaped molded core 1 on which the coil 100 is mounted is housed in the case 101, whereupon the molded core 1 is fixed to the case 101 using the bolts 102 and the fasteners 9.

Effects

With the reactor and manufacturing method thereof according to this embodiment, following effects are obtained.

(1) Only the yoke portion side core material 2 is molded within the resin 3, and therefore the yoke portion side core material 2 can be positioned within the die more easily and more accurately than in the prior art, where a plurality of core materials are molded simultaneously.

(2) The leg portion side core materials 51, 52, 53 and the spacers 6 are positioned relative to the yoke portion side core material 2 molded within the resin 3 while being guided by the tubular core mounting portions 91, 42 formed from the resin 3, and therefore the core materials and the spacers can be positioned accurately.

(3) The leg portion side core materials and the spacers are held by the tubular core mounting portions 41, 42 formed from the resin 3 from the periphery thereof, and therefore contact between the respective core materials and the spacers can be secured without using an adhesive. As a result, an assembly operation is simplified.

(4) The leg portion side core materials and the spacers are covered by the tubular core mounting portions 41, 42 formed from the resin 3, and therefore the core materials can be insulated from the coil 100 reliably.

(5) The two divided cores 11, 12 are fixed by bolting the fasteners 9 on the respective ends thereof to the case 101, thereby eliminating the need to provide another member in a joint part between the divided cores in order to maintain the joint between the two divided cores. More specifically, there is no need to provide an engagement member in the joint part or to fix a periphery of the joint part using resin or a coil bobbin to ensure that the two cores do not separate from each other, and therefore the configuration of the reactor can be simplified.

2. Second Embodiment

FIGS. 6 to 9 show a second embodiment of the present invention. In this embodiment, the two divided cores 11, 12 are both formed in a U shape. More specifically, in this embodiment, a length of left and right core mounting portions 41 of the first divided core 11 is set such that one leg portion side core material 51 can be mounted in the interior thereof, while a length of left and right mounting portions 42 of the second divided core 12 is set such that two leg portion side core materials 52, 53 can be mounted in the interior thereof.

Three tongue pieces 7 projecting to the second divided core 12 side are provided on respective tip ends of the left and right core mounting portions 41 of the first divided core 11. Three recessed portions 8 into which the tongue pieces 7 on the first divided core fit are provided on respective tip ends of the left and right core mounting portions 42 of the second divided core 12.

Other configurations and a manufacturing method according to this embodiment are similar to the first embodiment, and therefore description thereof has been omitted. Further, similar actions and effects to those of the first embodiment are obtained with this embodiment having the configuration described above.

Note, however, that in the first embodiment, the divided cores 11, 12 are formed in a J shape, and therefore the ring-shaped molded core 1 can be manufactured by inverting one of the two identically shaped divided cores 11, 12 and then combining the two divided cores 11, 12. In this embodiment, on the other hand, the two divided cores 11, 12 have different shapes, and therefore this method cannot be employed.

When manufacturing the ring-shaped molded core 1, however, neither of the divided cores 11, 12 needs to be inverted, and therefore the shapes of the respective divided cores 11, 12 can be selected freely. The shapes and positions of the fasteners of the respective divided cores 11, 12 can be modified, and members other than the fasteners can be molded within the resin. Furthermore, a coil positioning member can be provided on one of the divided cores 11, 12.

3. Other Embodiments

The present invention is not limited to the above embodiments, and includes other embodiments such as the following.

(1) Means other than bolting the fasteners provided on the molded core to the case may be employed as means for fixing the two abutting divided cores 11, 12 to each other integrally. For example, the two divided cores 11, 12 may be fixed to each other from the periphery thereof using a belt-form fastening fitting, or the entirety of the ring-shaped molded core and the coil may be further molded in resin.

(2) The engagement member for positioning the two divided cores may be provided in a location other than the core mounting portions of the divided cores 11, 12. Further, instead of the tongue pieces 7 and the recessed portions 8 used simply for positioning, as described above, members that are engaged to each other so that the two combined divided cores 11, 12 do not shift, such as a recessed portion and a latching pawl, may be used as the engagement member. A tongue piece and a recessed portion may be provided on one core mounting portion, and a tongue piece and a recessed portion that correspond thereto may be provided on the other core mounting portion. Furthermore, a tubular member into which the tip end of one core mounting portion is fitted may be provided on the tip end of the other core mounting portion.

Moreover, the engagement member is not necessarily limited to the core mounting portion, as shown in the drawings, and may be provided in another position of the leg portion.

What is claimed is:

1. A reactor comprising:
a ring-shaped molded core; and
a coil wound around the ring-shaped molded core, wherein
the ring-shaped molded core comprises divided cores including left and right leg portions and a yoke portion connecting the leg portions and formed by molding a yoke portion side core material within a resin, that is subsequently hardened;
left and right end surfaces of the yoke portion side core material molded within the resin are respectively exposed to the left and right leg portions of the divided core,
the left and right leg portions of the divided core are formed integrally from a resin molded to an outer periphery of the yoke portion side core material, and respectively include tubular core mounting portions extending from respective outer peripheries of the end surfaces of the yoke portion side core material,
an I-shaped leg portion side core material and a spacer are inserted into the tubular core mounting portions formed in the left and right leg portions such that the spacer is sandwiched between the end surface of the yoke portion side core material molded within the resin and an end surface of the leg portion side core material, and respective end portions of the core mounting portions of the two divided cores are abutted and integrated with each other to form a ring-shaped molded core.

2. The reactor according to claim 1, wherein the two divided cores are shaped identically, and one of the two divided cores is inverted upside-down.

3. The reactor according to claim 1, wherein an engagement member is provided on the leg portion of one of the divided cores to position the divided core relative to the other divided core.

4. The reactor according to claim 2, wherein an engagement member is provided on the leg portion of one of the divided cores to position the divided core relative to the other divided core.

5. The reactor according to claim 1, wherein a fastener is molded to the resin of the divided core.

6. The reactor according to claim 2, wherein a fastener is molded to the resin of the divided core.

7. The reactor according to claim 3, wherein a fastener is molded to the resin of the divided core.

8. The reactor according to claim 4, wherein a fastener is molded to the resin of the divided core.

9. The reactor according to claim 1 wherein the divided cores have one of a J-shape and a U-shape.

10. The reactor according to claim 9 wherein the divided cores include a tongue piece extending from one leg portion a first divided core and a second divided core has a recess portion configured to receive the tongue piece for positioning the first and second divided cores relative to each other when integrated to form the ring-shaped molded core.

* * * * *